June 19, 1962 R. D. BREMER ETAL 3,040,161
ELECTRIC HOT PLATE
Filed April 24, 1959 2 Sheets-Sheet 1

INVENTORS
Robert D. Bremer
BY James W. Vannorsdall
Frederick M. Ritchie
Their Attorney June 19, 1962     R. D. BREMER ETAL     3,040,161
ELECTRIC HOT PLATE
Filed April 24, 1959                                  2 Sheets-Sheet 2
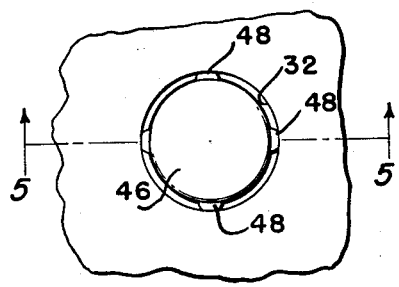
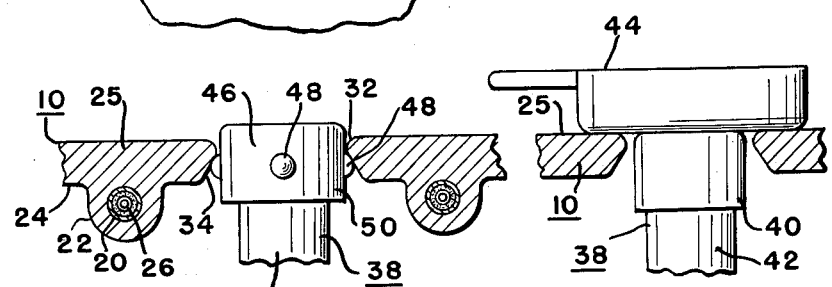
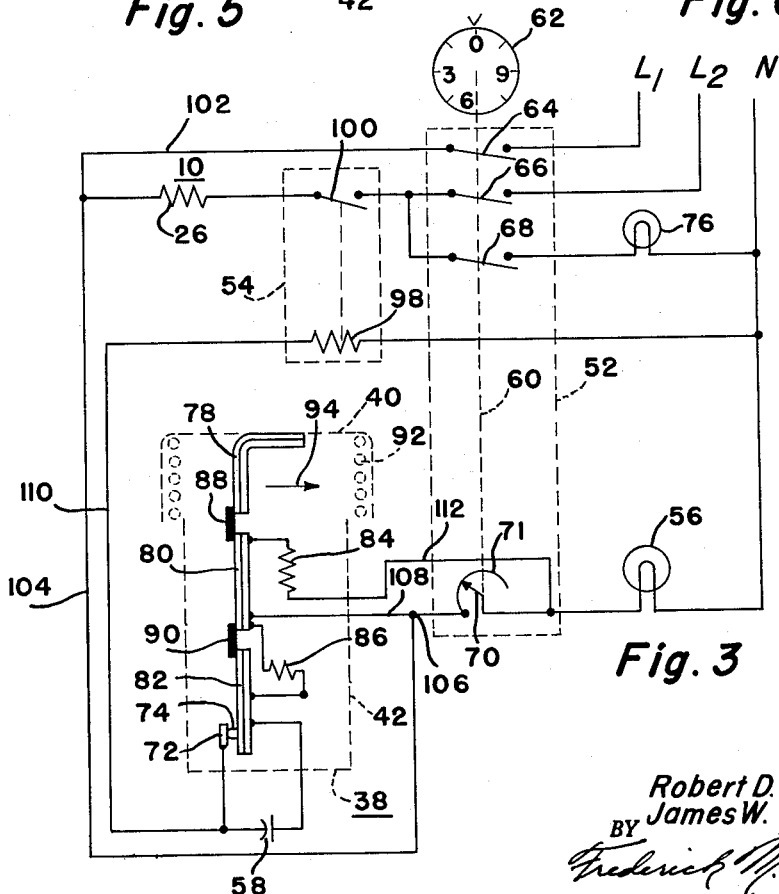
INVENTORS
Robert D. Bremer
James W. Vannorsdall
BY
Their Attorney

United States Patent Office 3,040,161
Patented June 19, 1962

---

3,040,161
ELECTRIC HOT PLATE
Robert D. Bremer, Dayton, and James W. Vannorsdall, Germantown, Ohio, assignors to General Motors Corporation, Detroit, Mich., a corporation of Delaware
Filed Apr. 24, 1959, Ser. No. 808,777
6 Claims. (Cl. 219—37)

This invention relates to a domestic appliance and more particularly to an improved control system for a surface cooking unit of an electric range.

One of the deterrents to the use of spiral tubular type cooking units in electric ranges is the difficulty with which such units are cleaned. It would be highly desirable to use a solid plate as a cooking unit wherein the surface thereof could be simply wiped off in any cleaning process. However the solid plate cooking units have not been generally accepted since they take longer to preheat than do the tubular cooking units and are more difficult to control. It is to the control aspect of a solid plate cooking unit that this invention is directed. It has been found that the castings of solid plate cooking units tend to warp if they reach excessive temperatures. Further, such excessive temperatures are known to exist when the solid plate unit is not carrying a pan or cooking utensil to aid in carrying off the heat generated.

Accordingly it is an object of this invention to provide a control system for a solid plate cooking unit.

Another object of this invention is the provision of a high wattage, high speed solid plate cooking unit which will not warp with extended usage.

It is also an object of this invention to provide a temperature responsive system which will serve to sense and control temperatures of food being cooked on a solid plate cooking unit and to limit the temperature of the solid plate unit itself when it is energized but not being used for cooking.

A further object of this invention is the provision of a control system for a high wattage, fast heating solid plate cooking unit which includes a temperature sensing device extending through an opening in the cooking unit for limiting the temperature of the cooking unit.

A still further object of this invention is to provide a temperature sensing unit head with head locating protuberance means for sensing and transmitting solid plate cooking unit temperatures when the cooking unit is unloaded, said protuberances being spaced from said cooking unit when the unit is loaded for facilitating temperature sensing of materials placed on the cooking unit.

Further objects and advantages of the present invention will be apparent from the following description, reference being had to the accompanying drawings wherein preferred embodiments of the present invention are clearly shown.

In the drawings:

FIGURE 3 is a schematic wiring diagram of a control circuit suitable for use with this invention;

FIGURE 4 is a fragmentary top elevational view of another embodiment of this invention;

FIGURE 5 is a fragmentary side sectional view partly in elevation taken along line 5—5 in FIGURE 4 with the temperature sensing unit in plate temperature limiting control position; and FIGURE 6 is a fragmentary sectional view similar to FIGURE 5 with the sensing unit head of the first embodiment in automatic cooking temperature sensing control position.

Figure 2:
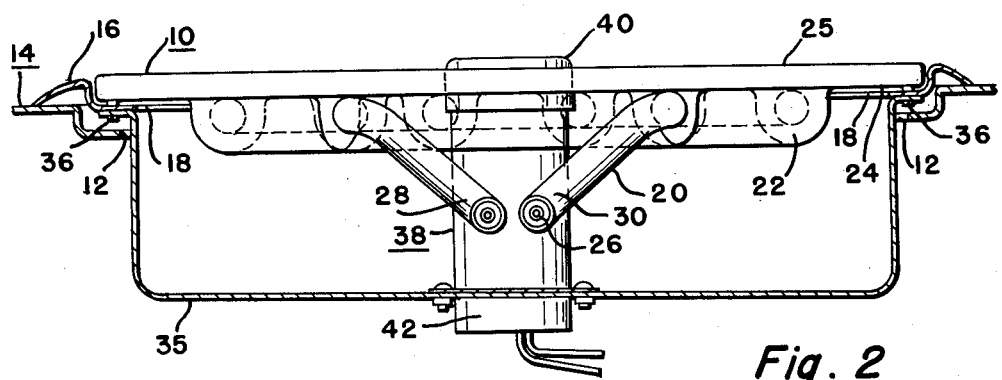
FIGURE 2 is a side elevational view partly in section of the solid plate cooking unit and temperature control mounting arrangement.
Figure 1:
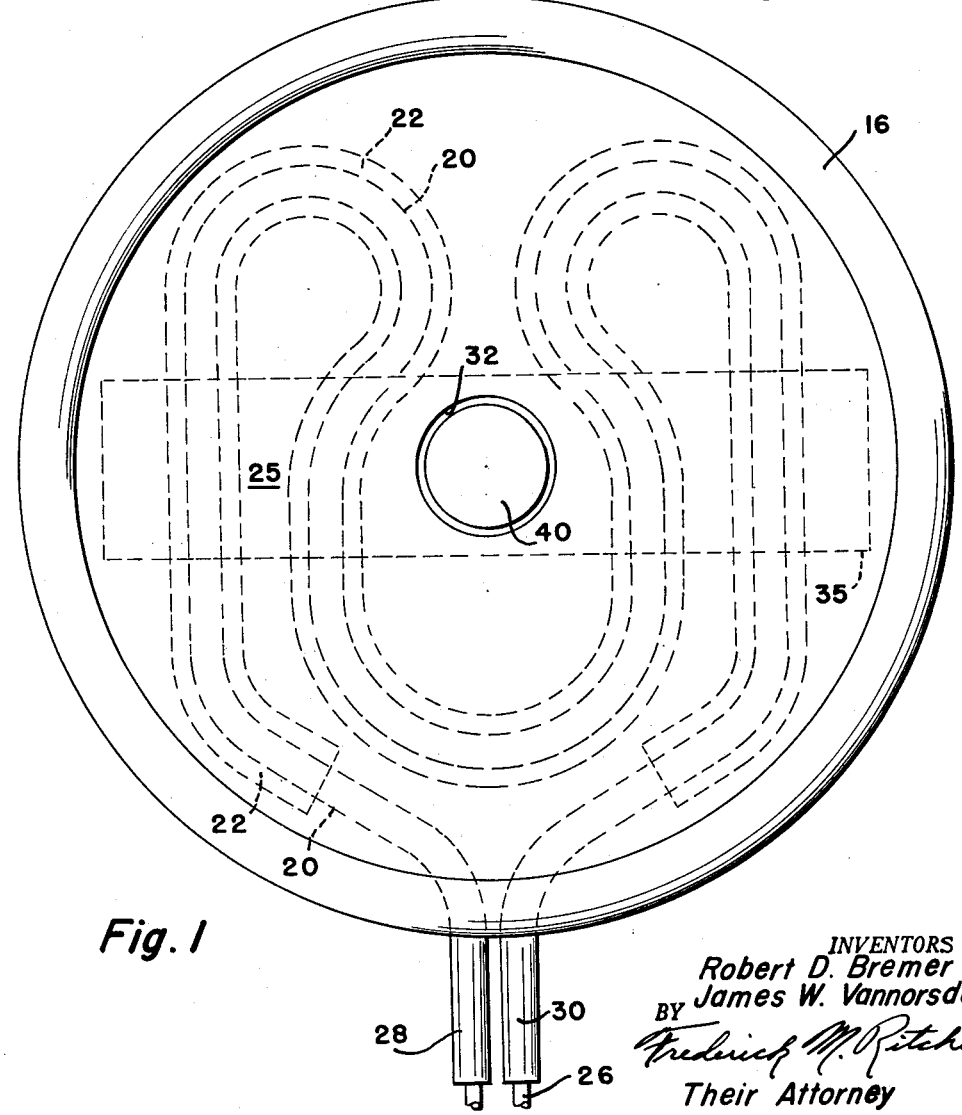
FIGURE 1 is an elevational view of a solid plate cooking unit suitable for use with this invention.

In accordance with this invention and with reference to FIGURE 2 a cooking unit 10 is shown supported within an opening 12 in an electric range or heating apparatus, a fragmentary portion of the top 14 thereof being shown. The range opening 12 is surrounded by a trim ring 16 having a shoulder 18 on which the cooking unit 10 is supported.

The cooking unit 10 is of solid plate construction and may be a casting of aluminum alloy or cast iron. A tubular heating element 20 is designed to be cast into a depending rib portion or protuberance 22 integral with the casting. This secures the heating element 20 in closely adjacent heat translating relationship to the underside 24 of the solid plate cooking unit 10. Since the cooking unit 10 is of the temperature controlled variety, the heating element 20 enclosese a single resistance wire 26 therein. The resistance wire 26 is compacted by any suitable dielectric such as magnesium oxide to hold it in spaced relationship to the side walls of the tubular type heating element 20. The resistance wire 26 of the heating element 20 terminates in terminal portions 28 and 30 to which electrical connections can be made for energizing and controlling the cooking unit 10.

The solid plate unit 10 of this invention includes an aperture 32 in the central portion of the circular plate. The aperture 32 is formed with a downwardly opening conical wall portion 34 as best seen in FIGURE 5. Beneath the opening 32 is a bracket 35 fastened as by a bolt 36 to the shoulder 18 of the trim ring 16. The bracket 35 serves to support a sensing unit shown generally at 38 within the aperture 32. The sensing unit 38 includes a temperature sensing head 40 which moves relatively to a body portion 42 of the sensing unit 38 and extends upwardly through the aperture 32. When a pan or utensil such as 44 in FIGURE 6 is placed on the top surface 25 of the cooking unit 10, the sensing head 40 is compressed or lowered until it finds the surface level 25 of the cooking unit and fits firmly against the bottom of any pan resting on the cooking unit. In this position the sensing unit 38 is effective to control the temperatures automatically of any substance cooking within the pan as best seen in FIGURE 6. When the pan 44 is removed the sensing head 40 raises to the position seen in FIGURE 2. In this raised position the temperature of the cooking unit or plate 10 is sensed and limited by the inner workings of the sensing unit 38 as will be described more fully hereinafter.

FIGURES 4 and 5 are illustrative of another embodiment of this invention wherein the sensing unit 38 is provided with a differently formed sensing head 46. The sensing head 46 in this embodiment includes four protuberances 48 spaced about the depending flange 50 of the sensing head 46. When the sensing head 46 is in its unloaded or raised position seen in FIGURE 5, the protuberances 48 engage the conical wall 34 of the cooking unit opening 32. This engagement serves to locate the sensing head 46 in the opening 32 and also serves to transmit a small amount of heat from the cooking unit 10 to the sensing head 46. It should be understood that the size of the opening 32 and the slope of the conical wall 34 may be altered without departing from the teachings of this invention. This may be done in accordance with the amount of heat sought to be transmitted from the cooking unit 10 to the sensing head 46 when the cooking unit is unloaded. The closer the edge of the aperture is to the sensing unit and the greater the mass of the cooking plate at this point, the more heat will be transmitted. Thus the maximum temperature which the cooking unit 10 will reach is governed both by the sensing unit 38 and by the design of the aperture 32 through which the sensing head 46 extends.

The operation of the combined automatic cooking temperature regulating control and cooking unit or plate temperature limiting control is believed best understood with reference to FIGURE 3. This combination control system uses four primary parts: a switch assembly 52, the sensing unit 38, a thermal relay 54 and a voltage regulator lamp 56. Another desirable component is a capacitor 58 which prevents sparking at the contacts in the sensing unit 38, prolongs the life of the contacts and reduces radio interference in the area surrounding the use of the sensing unit 38.

The switch assembly 52 is comprised of a shaft 60 operated by a user's control knob 62. Rotation of the shaft 60 from the off position shown in FIGURE 3 operates the line contact switch blades 64 and 66, a pilot lamp switch blade 68 and an internal rheostat 70. This rheostat 70 provides a means for adjustment of temperature physically remote from the sensing head 40.

The sensing unit 38 is a control device mounted in the central aperture 32 of the surface unit 10. The cylindrical container has a spring-mounted top cap 40 which facilitates good alignment with the bottom of the cooking utensil such as 44. The purpose of this unit is to sense the actual utensil temperature, acting as a thermostat to control the temperature automatically by opening and closing a pair of contacts 72, 74. The opening and closing of contacts 72, 74 serve to control the amount of time that the heating element 20 is energized and thus controls the heat emitted by the cooking unit 10.

The thermal relay 54 is a slow-acting type of relay serving as a power amplifier to handle the high power level required by the surface unit 10 but in response to the small control currents which can be handled by the sensing unit 38. A thermal type may be used, rather than a magnetic type, to provide a slight time-delay which is desirable to avoid chatter at the contacts 72, 74.

The voltage regulator lamp 56 may be a standard type rated at approximately 25 watts. Production of light is incidental to its use. The lamp serves merely as an inexpensive voltage regulator and its use minimizes changes in the temperature control system calibrations with changes in line voltage.

The assembly 52 contains the three sets of switches, 64 and 66 for the line connections $L_1$, $L_2$ and switch 68 for a pilot lamp such as 76—the lamp 76 serving as an indication of the energization or operation of the solid plate cooking unit 10. The rheostat 70 may be adjusted continuously by the rotation of the knob 62, the resistance in ohms increasing with clockwise rotation of the knob, i.e. with a desire for higher operating temperatures of the utensil. The rheostat 70 may include a special resistance winding 71 in order to permit the resistance selected to increase at a slow rate in the boiling range (positions 0 to 6) to give a close temperature control, and at a more rapid rate thereafter in the high temperature range.

The sensing unit 38 is designed to include three operating bimetals 78, 80 and 82, two heaters 84 and 86, the pair of contacts 72, 74 and two supporting insulators 88 and 90 to isolate the bimetals from each other. The primary bimetal piece 78 is welded to the inner surface of the cap 40 which is spring-biased relative to the body 42 of the sensing unit by a spring 92. The bimetal 78 flexes in the direction shown by the arrow 94 when heated. This bimetal piece 78, together with the contacts 72, 74 are a typical operating means for a thermostat or temperature controller. However it is necessary to add additional components in order to permit the user's adjustment of temperature by the rheostat in the switch assembly 52. Also it is necessary to compensate for ambient temperatures which vary considerably near a surface unit such as 10 when it is in operation. Still further, it is necessary to provide close control of the temperatures by artificial means in order to shorten the "On-Cycle"—a device known in the art as a heat anticipator.

To permit the user's adjustment of temperature by the rheostat 70 the second piece of bimetal 80 is placed in proximity to the heater 84. The current through the heater 84 is varied by the rheostat 70 which is connected electrically in parallel with the heater. At high temperature selection, the resistance of the rheostat is high and additional current is diverted through the heater 84. The heat loss from this current causes the bimetal 80 to flex in a direction to close the contacts 72, 74 which in turn requires a higher temperature at the bimetal 78 to again open the contacts 72, 74. As a result, the temperature existing at the bottom of the utensil 44 is increased. The converse is true for the low temperature ranges.

In compensating for ambient temperatures a third piece of bimetal 82 is included which responds to ambient temperature rather than to the temperature of the utensil such as 44. The bimetal 82 flexes in such a direction that it opposes the motion of bimetal 80 and as a result, the temperature of utensil 44 tends to remain constant at various ambient temperatures.

The provision for close temperature control to prevent over-shoot is effected through the use of a heat anticipator. To provide this a small heater 86 is adapted to supply pulses of heat to bimetal 82 during the cycling intervals when the contacts 72, 74 are closed. This heat promotes rapid reopening of the contacts 72, 74 and thus shorter on cycles are obtained with better temperature control and less over-shoot. Note that the three bimetals 78, 80 and 82 are insulated one from the other by the supporting insulators 88 and 90.

The thermal relay 54 contains a wire-wound heater 98 and a normally open switch blade 100. Current passes through the heater 98 whenever the contacts 72, 74 in the sensing unit 38 are closed. After a short time delay the heater 98 is effective to close the switch 100 to complete the circuit to the resistance wire 26 of the surface unit 10.

As aforesaid the voltage regulator lamp 56 has a characteristic that the resistance of the lamp changes with changes of voltage applied to it. As the voltage increases the lamp resistance increases which therefore tends to maintain constant voltage for the balance of the control circuit. In operation the user will merely rotate the control knob 62 to the desired setting. The mere rotational operation of the control knob 62 will close contacts 64, 66 and 68. Thus power will flow from $L_1$ through switch 64 and line 102 but current is interrupted at switch 100 to the solid plate cooking unit 10. The sensing element 38 is energized from $L_1$, switch 64, line 102, line 104 to a junction 106. From the junction 106 power can flow by way of line 108 to the bimetal 80 and from this point through a heat anticipator heater 86 to the bimetal 82 and consequently through the contacts 72, 74 to line 110, thermal relay heater 98 to the neutral side of the line. If for instance a utensil 44 has been placed on the cooking unit 10 the entire system will indicate cold and the contacts 72, 74 will be closed. In this situation the heater 98 will be energized and the switch 100 will be closed after a short delay period to energize the circuit for heater 10 through $L_1$, switch blade 64, line 102, switch blade 100, manual switch 66 to $L_2$. During the cooking operation the temperature of the utensil 44 and any material placed therein will be controlled in accordance with the setting of the rheostat 70 by the knob 62. This is accomplished from the junction point 106 in the circuit through the rheostat resistance winding 71, line 112, temperature adjustment heater 84 and bimetal 80. Thus the auxiliary bimetals 80 and 82 are both in the circuit— one by way of controlling cooking temperatures and the other by way of heat anticipation to prevent over-shoot and correcting for ambient temperature variations. As the temperature within the utensil 44 reaches the preselected temperature, the bimetal 78 will bend in the direction of arrow 94 to open the contacts 72, 74, thereby deenergizing heater 98 which, in turn, opens the switch 100 to deenergize the resistance coil 26 of the cooking unit 10. In accordance with the temperature selected by the positioning of rheostat 70 the contacts 72 and 74 will open and close to control the temperature of the cooking process. During this cooking operation the utensil 44 will be effective to carry off substantially all of the heat generated by the cooking unit 10 and the cooking unit 10 will assume a temperature only slightly higher than the utensil itself. However, should the utensil 44 be removed without changing the knob 62 to disconnect the cooking unit 10 the temperature of the solid plate cooking unit 10 will tend to increase. It is to this unloaded condition of the cooking unit that another aspect of this invention is directed.

In the prior art devices the sensing head 40 merely pressed against the bottom 24 of a solid plate unit 10 rather than against the cooking utensil 44 itself. This procedure made it necessary to use materials within the sensing unit 38 which could stand temperatures in the range of 800° F. and above—the temperature of the plate 10. Such materials are expensive and not generally utilized in the manufacture of dependable controls for domestic appliances. In this invention the sensing head 40 is not in contact with the cooking unit 10 and therefore the operating temperatures thereof are not equal to the temperatures of the solid plate itself. With the sensing head 40 located centrally in the opening 32 of the cooking unit 10 the removal of a utensil 44 will place the cooking unit in an unloaded condition and the heat will be radiated from the cooking unit 10 about the periphery of the opening 32 to the sensing head 40. Should the control knob 62 be set for the highest possible heat, i.e. in the neighborhood of 475° F. for a frying operation, the heat radiated from the unloaded cooking unit 10 to the sensing head 40 would interrupt the operation of the heating element 20 at approximately 1000° F., thereby limiting the temperature of the cooking unit or plate 10 to an extent below that at which the solid plate would warp or crack. Such an arrangement also permits the utilization of materials within the sensing unit 38 which operate effectively below 500° and this too is an advantage in manufacturing an economical and reliable sensing device.

It should now be seen that a control system has been devised for a high speed solid plate cooking unit which will control the temperatures of a cooking utensil placed on the cooking unit 10—a loaded condition. The control system is also effective to limit the upper temperatures of the solid plate 10 and to permit the utilization of less expensive materials within the sensing unit 38 when the utensil 44 has been removed from the cooking unit 10— an unloaded condition. This novel arrangement is now believed to make the use of solid plate cooking units fully effective, practical and dependable. With the teachings of this invention it is now possible for the art to utilize solid plate heaters with their inherent cleanliness characteristics without the fear of plate warpage due to overheating when the unit is unloaded. Still further, higher wattage heating elements may be applied to solid plate cooking units than has been heretofore possible. For instance, prior art solid plate devices have been limited to the maximum wattage which could be applied without causing plate warpage. The six inch plate unit in the past could carry safely up to approximately 1000 watts while the eight inch plate unit could utilize safely only up to approximately 1900 watts. Now, however, such six and eight inch plates can have applied thereto up to approximately 1600 watts and 3000 watts respectively. The temperature limiting feature of this invention will protect against plate overheating and warpage and the higher wattages will serve to make solid plate cooking units more efficient in operation and more rapid in preheat and control response. In accordance with this invention the addition of protuberances 43 to the sensing head has been shown to be both an effective locating device and a means for transmitting limited amounts of heat from the solid plate to the sensing head. It should be recognized that such protuberances could also be cast or formed integrally with the plate within the plate opening 32 to accomplish the same end result.

While the embodiments of the present invention as herein disclosed, constitute preferred forms, it is to be understood that other forms might be adopted.

What is claimed is as follows:

1. A control system for a solid plate cooking unit adapted to support a utensil comprising, a solid plate casting having an opening therein, said opening having a downwardly opening conical side wall portion, resistance means cast integrally with said plate casting on one side thereof, power supply means for selectively energizing said resistance means, a support for said casting, a bracket attached to said support and extending beneath said opening, a temperature sensing unit carried by said bracket and extending into said opening, said sensing unit having a spring biased sensing head with a first position above said casting and a second position coplanar with said casting, and temperature responsive means in said sensing unit for controlling the temperature of said utensil when said head is in said second position and for controlling the temperature of said casting when said head is in said first position.

2. A control system for a solid plate cooking unit adapted to support a utensil comprising, a solid plate casting having a depending rib and an opening, said opening having a generally vertical side wall portion, resistance means cast integrally with said depending rib, a support for said casting, a bracket attached to said support, a temperature sensing device carried by said bracket and adjacent said opening, said sensing device having a movable sensing head portion with a first position above said casting and a second position coplanar with said casting, means connected with one of said portions for transmitting a small amount of heat from said casting to said sensing head portion when in said first position, and temperature responsive means in said sensing device for controlling the temperature of said utensil when said head is in said second position and for controlling the temperature of said casting when said head is in said first position.

3. In combination, a solid plate cooking unit adapted to support a utensil and having an opening defined by a wall portion, means for heating said cooking unit, a sensing unit for controlling said heating means only during energization thereof, a sensing head portion associated with said sensing unit and having a first and second position, means connected with one of said portions for transmitting a small amount of heat from said cooking unit to said sensing head portion when in said first position, and means for placing said sensing head portion into said second position for controlling the temperature of said utensil when said utensil is on said cooking unit and into said first position for limiting the temperature of said cooking unit to an extent below that temperature at which the unit would be damaged and above room temperature when said utensil is not on said cooking unit.

4. In combination, a solid plate cooking unit adapted to support a utensil and having an opening defined by a wall portion, means for heating said cooking unit, a sensing unit beneath said cooking unit for controlling said heating means, a sensing head portion connected to said sensing unit and having a first and second position, a protuberance on one of said portions for extending into engagement with the other of said portions when said sensing head portion is in said first position, and means for biasing said sensing head portion into said second position when said utensil is supported on said cooking unit and into said first position when said utensil is not supported on said cooking unit.

5. A control system for a plate type cooking unit adapted to support a utensil comprising, a plate casting having an opening therein and a depending protuberance, sheathed tubular resistance means cast integrally with said protuberance, a support for said casting, a temperature sensing unit extending into said opening, said sensing unit having a movable sensing head with a first position above said casting and a second position coplanar with said casting, and temperature responsive means in said sensing unit for controlling the temperature of said utensil when said head is in said second position and for controlling the temperature of said casting when said head is in said first position.

6. A control system for a solid plate cooking unit adapted to support a utensil comprising, a solid plate casting having an opening therein, said opening having a downwardly opening conical side wall portion, resistance means integral with said casting on one side thereof, a support for said casting, a bracket attached to said support and extending beneath said opening, a temperature sensing unit carried by said bracket and extending into said opening, said sensing unit having a spring biased sensing head with a first position above said casting and a second position coplanar with said casting, a protuberance on said sensing head and adapted to engage said wall portion in said first position, and temperature responsive means in said sensing unit for controlling the temperature of said utensil when said head is in said second position and for controlling the temperature of said casting when said head is in said first position with said protuberance engaging said wall portion.

References Cited in the file of this patent
UNITED STATES PATENTS

| | | |
|---|---|---|
| 2,182,682 | Shroyer | Dec. 5, 1939 |
| 2,715,176 | Schoberle | Aug. 9, 1955 |
| 2,813,963 | Lennox | Nov. 19, 1957 |
| 2,867,712 | Schwaneke | Jan. 6, 1959 |